United States Patent [19]

Uchiyama et al.

[11] Patent Number: 5,800,032
[45] Date of Patent: Sep. 1, 1998

[54] SELF CORRECTING PROJECTOR

[75] Inventors: Takayuki Uchiyama, Yokohama; Hirobumi Arima, Kawasaki, both of Japan

[73] Assignee: Nikon Corporation, Tokyo, Japan

[21] Appl. No.: 855,115

[22] Filed: May 13, 1997

[30] Foreign Application Priority Data

May 14, 1996 [JP] Japan ................. 8-118925
May 29, 1996 [JP] Japan ................. 8-134782

[51] Int. Cl.⁶ ........................................ G03B 21/14
[52] U.S. Cl. ........................................ 353/69; 353/119
[58] Field of Search ........................ 353/69, 70, 119, 353/34, 37, 122, 31

[56] References Cited

U.S. PATENT DOCUMENTS

| 5,355,188 | 10/1994 | Biles et al. ............... 353/69 |
| 5,422,692 | 6/1995 | Nishiki ..................... 353/69 |
| 5,622,417 | 4/1997 | Conner et al. ........... 353/69 |
| 5,641,957 | 6/1997 | Chae ....................... 353/70 |

FOREIGN PATENT DOCUMENTS

A 3-261933  11/1991  Japan .
A 5-207405  8/1993  Japan .

*Primary Examiner*—William Dowling
*Attorney, Agent, or Firm*—Oliff & Berridge, PLC

[57] ABSTRACT

A projector for projecting images onto a screen which includes automatically adjusting the image to correct for horizontal slant. The projector includes a spatial light modulation element and a projection optical system including an optical axis. The spatial light modulation element is automatically rotated about the optical axis to correct for horizontal positioning of the projected image. In a first embodiment the spatial light modulation element is rotated about the optical axis utilizing a gravitational weight. In another embodiment the spatial light modulation element is rotated about the optical axis in response to a sensor signal. The projector also includes the ability to convert the image from a horizontal projection to a vertical projection in response to a changeover signal.

31 Claims, 12 Drawing Sheets

SELF CORRECTING PROJECTOR

INCORPORATION BY REFERENCE

The disclosures of the following priority application(s) are herein incorporated by reference:

Japanese Patent Application 8-118925 filed May 14, 1996.

Japanese Patent Application 8-134782 filed May 29, 1996.

BACKGROUND OF THE INVENTION

1. Field of Invention

The invention relates to a projector for displaying an enlarged image onto a screen. In particular, the present invention relates to a projector for automatic correction of a slanted image.

2. Description of Related Art

In general, projectors include projectors that project film images and liquid crystal projectors which project picture image light formed using a liquid crystal panel as a spatial light modulation element. Japanese Patent Laid-Open Publication Nos. H.3-261933 and H.5-207405 disclose such projectors. Typically, projectors are equipped with a light source, a mount into which the film is loaded and a projection optical system. Liquid crystal projectors typically include at least a light source, a liquid crystal panel and a projection optical system. The light sources may be xenon lamps, halogen lamps or metal halide lamps.

FIG. 1 is a perspective drawing showing an example of a conventional liquid crystal projector 100. The projector 100 includes a light source 2, a relay optical system 3, a polarized beam splitter 4, a cross dichroic mirror 5, reflection-type spatial light modulation elements 6B, 6G and 6R, a projection optical system 7, an electrical power source 8, and an electrical circuit 9 within a case 1. Light radiated from the light source 2 is natural light having the properties of circularly polarized light. After being transmitted through the relay optical system 3, the light is incident to the polarized beam splitter 4. The polarized beam splitter 4 separates the light from the light source 2 into reflected linear polarization (S polarization) and transmitted linear polarization (P polarization) by dielectric multi-layer film 4A. The S polarization is further separated into the three primary colors of red (R), green (G), and blue (B) by a cross dichroic mirror 5. The separated light then enters the spatial light modulation elements 6B, 6G and 6R, respectively. When voltage is selectively supplied to the spatial light modulation elements 6B, 6G and 6R, respectively, corresponding to the pixel configuration of the image to be projected, the S polarization partially rotates in the direction of its polarization, corresponding to the image, and becomes picture image light. Then, by re-entering the cross dichroic mirror 5, therein forms a composite. The light becomes composite picture image light which then re-enters the polarized beam splitter 4. In this case, the S polarization that has entered the spatial light modulation elements 6B, 6G and 6R, becomes S+P polarization by being modulated by a picture image signal. Accordingly, among the composite picture image light that has re-entered the polarized beam splitter 4, only the P polarization is transmitted through the polarized beam splitter 4, projected onto a screen 11 via the projection optical system 7, and forms a color projection image 12. FIG. 2 illustrates another conventional projector. Herein a light source 2 is fixed to a fixing member 8 within the case 1. The cross dichroic mirror 5, the spatial light modulation elements 6B, 6G and 6R are fixed onto a frame 9 after optical axis adjustment or after position adjustment of each part.

When either of the conventional projectors is used, the projector is placed on a desk or a special stand 10. The height of the case 1 is adjusted through height adjusting mechanisms 13 provided on the bottom surface on the front end of the case 1 by manually rotating the mechanisms 13 to adjust the angle of view and the orientation of the projected image 12. This type of adjustment proceeds similarly in a common projector that projects film images. These height adjusting mechanisms 13 can only be adjusted one at a time, so that as shown in FIG. 3b, when one of the height adjusting mechanisms 13 is adjusted, the case 1 is slanted, and the image 12 on the screen 11 becomes slanted, such that it is necessary to adjust the other height adjusting mechanism 13 in order that the reflected image 12 becomes horizontal. This additional adjustment requires additional time and effort to provide a horizontal display image.

Further, it has become common to connect liquid crystal projectors and personal computers to perform presentations. In these presentations, document files, graphs and the like, are displayed as a vertical format file or by scanning in a paper or business document by a scanner to be displayed via the projector. However, because the projector has a horizontal screen, in order to display files in a vertical format, it is necessary to reduce them thereby making it hard to see the content of vital documents, and wasting a large part of the projection image surface. Further, in cases in which it is not reduced, it becomes necessary to frequently perform a vertical and/or horizontal scrolling operation during presentations, which creates problems such as requiring time to scroll through documents during the presentation.

SUMMARY OF THE INVENTION

This invention therefore provides a projector able to automatically correct the orientation (slant) of a projected image, by providing an automatic leveling function.

Therein the present invention provides a projector equipped with a light source, a spatial light modulation element, and a projection optical system, wherein the spatial light modulation element is retained via a retaining member so as to freely rotate about the optical axis of the projection optical system, and the orientation in the horizontal direction of the spatial light modulation element is corrected by providing the spatial light modulation element with an automatic leveling function via a gravitational member.

Additionally, the present invention provides a projector which accommodates a light source, a spatial light modulation element, and a projection optical system within a housing, wherein the optical axis of the projection optical system coincides with the center of said spatial light modulation element, and wherein the housing is retained by a retaining member so as to freely rotate about the optical axis, and the orientation in the horizontal direction of the housing is corrected by providing the housing with an automatic leveling function via a gravitational member.

Additionally, the present invention provides a projector wherein an optical unit composed of a light source, spatial modulation elements, and a projection optical system is positionally arranged in a housing, wherein the optical axis of the projection optical system coincides with the center of the spatial light modulation element, and wherein the optical unit is retained via the housing so as to be free to rotate about the optical axis, and the orientation in the horizontal direction of the optical unit is corrected by providing the optical unit with an automatic leveling function via a gravitational member.

Additionally, the present invention provides a projector which accommodates a light source, a spatial light modulation element and a projection optical system within a housing, wherein the optical axis of the projection optical system coincides with the center of the spatial light modulation element, and wherein the housing is retained via a retaining member so as to freely rotate about an axis parallel to the optical axis, and the orientation in the horizontal direction of the housing is corrected by providing the housing with an automatic leveling function via a gravitational member.

Additionally, the present invention provides a projector equipped with a light source, a mount into which film is loaded, and a projection optical system, wherein the mount is retained by a retaining member so as to freely rotate about the optical axis of the projection optical system, and the orientation in the horizontal direction of the mount is corrected by providing the mount with an automatic leveling function via a gravitational member.

Additionally, the present invention provides a projector equipped with a spatial light modulation element and with an automatic leveling mechanism that retains the spatial light modulation element so that it freely rotates about the optical axis of a projection optical system, detects a slant of the horizontal direction of the spatial light modulation element via a sensor and automatically corrects the slant.

The present invention further provides a projector which includes an automatic leveling mechanism that integrates a spatial light modulation element and a dichroic mirror to form an optical block, wherein the optical block is freely rotatable about the optical axis of the projection optical system. The automatic leveling mechanism detects the slant in the horizontal direction of the optical block via a sensor and automatically corrects the slant.

Additionally, the present invention provides an automatic leveling mechanism including an actuator that rotates a spatial light modulation element about the optical axis of a projection optical system and an image position controller that controllably drives the actuator via a signal from a sensor.

Additionally, the present invention provides an automatic leveling mechanism equipped with an actuator that rotates an optical block about the optical axis of a projection optical system and an image position controller that controllably drives the actuator via a signal from a sensor.

Additionally, the present invention provides a projector including a vertical/horizontal image surface changeover switch which while simultaneously and controllably driving an actuator via a signal from a vertical/horizontal image surface changeover switch also controls a drive circuit of a spatial light modulation element.

DETAILED DESCRIPTION OF PREFERRED EMBODIMENTS

Figure 4:
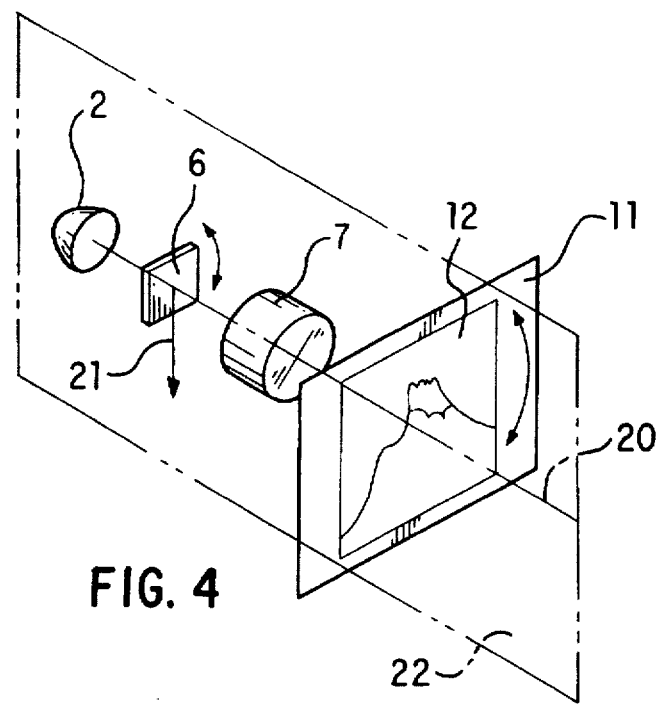
FIG. 4 is a perspective view illustrating the basic configuration of a projector relating to the present invention.

FIG. 4 is a perspective view showing the basic configuration of the present invention as applied to a liquid crystal projector. The projector includes a light source 2 and a spatial light modulation element 6 arranged in an identical straight line such that their center coincides with the optical axis 20 of the projection optical system 7. Further, the spatial light modulation element 6 is provided with an automatic leveling function so as to freely rotate about the optical axis 20, with the result that the orientation in the horizontal direction is automatically corrected and a horizontal position is maintained.

Figure 1:
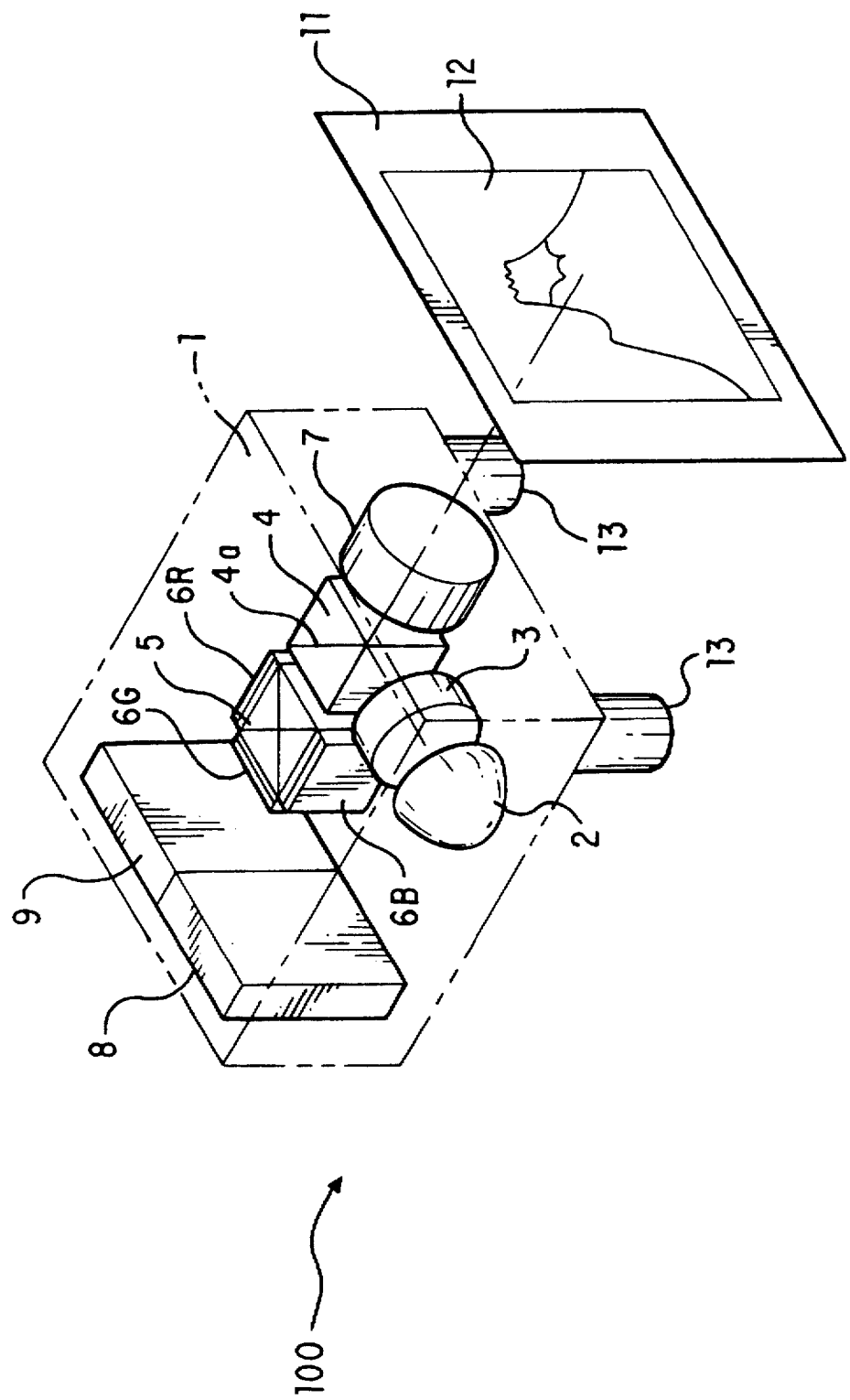
FIG. 1 is a perspective view of a conventional projector.
Figure 2:
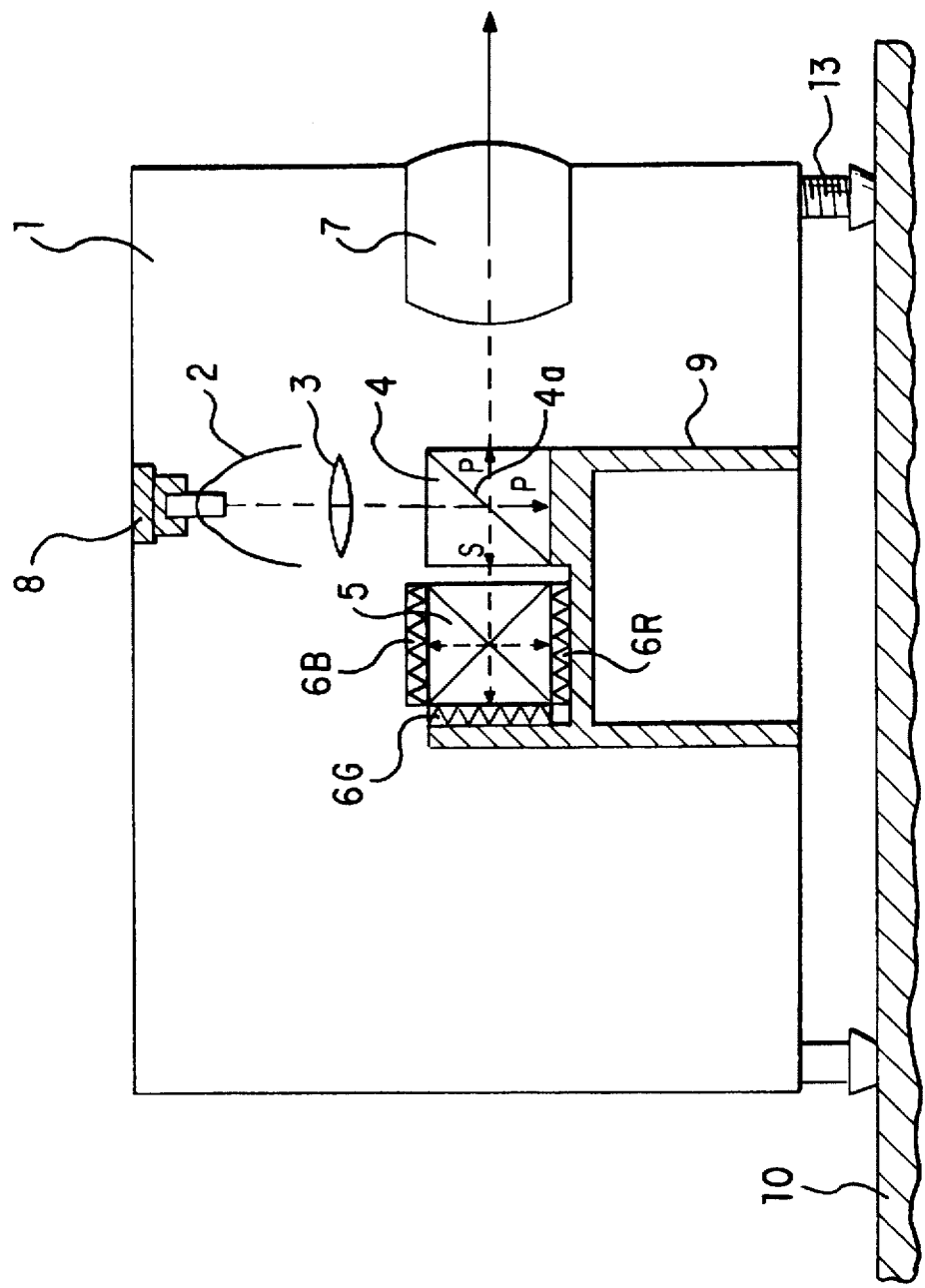
FIG. 2 is a schematic block diagram of another example of a conventional projector.
Figure 3B:
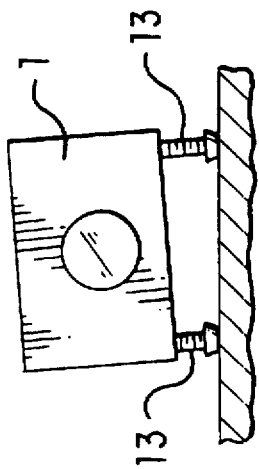
FIG. 3(a), (b) illustrates a projector and the slant of an image.

The automatic leveling function operates to correct the orientation of an image even when, as illustrated in FIG. 3(b) the case is slanted, by rotation about the optical axis 20. The spatial light modulation element will rotate only to an angle identical to the orientation angle of the case, to the opposite side of the orientation direction of the case, so as to render the picture image 12 projected onto the screen 11 in a horizontal fashion. As illustrated in FIG. 4, in order to provide the automatic leveling function, the position of the center of gravity G of the spatial light modulation element 6 is on a vertical line passing through the center of the element 6 itself. Also, a gravitational member may be provided, within a vertical plane 22 that includes the optical axis 20 of the projection optical system 7 and below the position of the center of gravity G. As a gravitational member, the specific gravity of a heavy metal, such as lead, can be used or, in accordance with the configuration arrangement of the optical system, the light source 2 itself may be used as a gravitational member. Moreover, arrow 21 denotes the vector direction of the center of gravity G.

In a liquid crystal projector, as illustrated in FIG. 4, even when a case (not shown) that accommodates the light source 2 and the spatial light modulation element 7 is positionally arranged slanted to the left or the right, the spatial light modulation element 6, having an automatic leveling function rotates to the opposite side, automatically correcting the orientation in the horizontal direction, so that the image 12 is projected horizontally onto the screen 11. Accordingly, it is unnecessary to adjust the orientation of the image, requiring only adjustment of the angle of view.

Further, the center of the spatial light modulation element 6 is positioned on the optical axis 20 of the projection optical system 7 and formed as the center of rotation. As a result, even when the spatial light modulation element 6 rotates to the opposite side of a case 1, in order to maintain a level state, there is no equivalent influence exerted on the image 12, so that a preferable picture image is formed.

Figure 5:
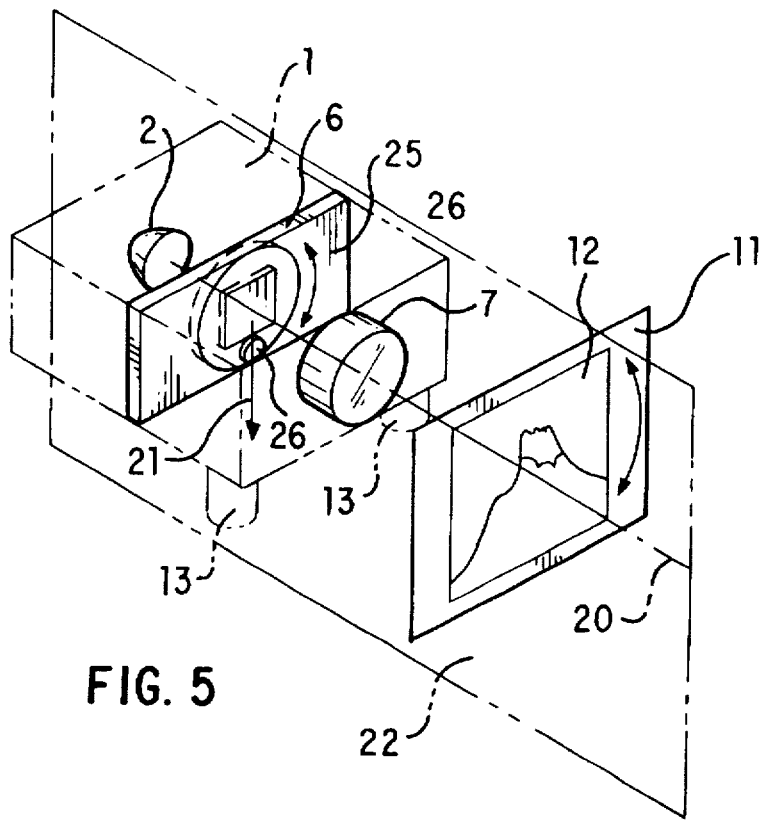
FIG. 5 is a perspective view showing a first embodiment of the present invention.

FIG. 5 is a perspective view illustrating a first embodiment of the present invention. In this figure, the case 1 is provided with two height adjustment mechanisms 13 provided at the bottom surface front edge. Inside the case 1, a light source 2, a spatial light modulation element 6 and a projection optical system 7 are accommodated. The spatial light modulation element 6 is supported by a retaining member 25 so as to rotate freely about the optical axis 20 of the projection optical system 7. Also the spatial light modulation element 6 has an automatic leveling function provided through a weight 26 which is installed as a gravitational member at the center of the directional width of the bottom edge side.

In arranging a liquid crystal projector composed of this type of structure on a setting stand or platform, the case 1 is arranged so that it is upright with regard to the screen and the angle of view is adjusted.

At this time, in a conventional liquid crystal projector described above, the spatial light modulation element 6 is arranged and is fixed within the case. As a result, it is necessary to perform adjustment of the projected image position and adjustment of the orientation of the projected image 12 via both of the height adjusting mechanisms 13. If for instance the height adjusting mechanisms 13 are not evenly adjusted the present invention will automatically adjust for any slant. That is, even when the case 1 is slanted, the spatial light modulation element 6 itself rotates via the automatic leveling function, and the orientation in the horizontal direction is corrected. As a result, the image 12 can be projected horizontally on the screen 11. Accordingly, the adjustment of the orientation of the image is unnecessary. Further, it is acceptable to perform this adjustment only when the top surface of the platform or desk upon which the projector is arranged is slanted.

Figure 6:
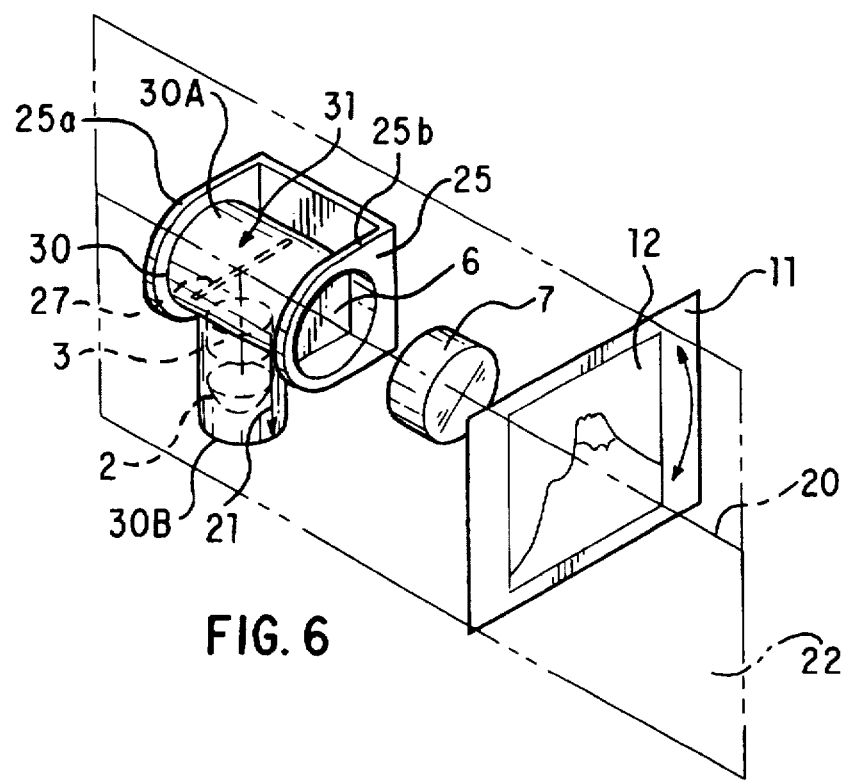
FIG. 6 is a perspective view showing a second embodiment of the present invention.

FIG. 6 is a perspective view illustrating a second embodiment of the present invention. In this embodiment, there is an optical unit 31 in which a light source 2, a relay optical system 3, a spatial light modulation element 6 and a mirror 27 are accommodated within a housing 30. The optical unit 31 is retained by a retaining member 25 so as to rotate freely about the optical axis 20 of the projection optical system 7. The projection optical system 7 and the optical unit 31 are accommodated within a case (not shown). The center of the spatial light modulation element 6 is positionally arranged within the housing 30 such that it coincides with the optical axis 20. The housing 30 has a horizontal cylinder 30A and a vertical cylinder 30B formed integrally into a T-shape. The spatial light modulation element 6 and the mirror 27 are accommodated within the horizontal cylinder 30A and the light source 2 and the relay optical system 3 are accommodated within the vertical cylinder 30B. As a result, the optical axes of the light source 2 and the projection optical system 7 are mutually orthogonal.

The retaining member 25 is formed, when viewed from the side, as a three sided, open rectangle. Axle holes, provided in both plate sides 25A and 25B of retaining member 25 support both ends of the horizontal cylinder 30A. The horizontal cylinder 30A is axially supported so as to freely rotate wherein the axis of the horizontal cylinder 30A coincides with the optical axis 20. The light source 2 and the relay optical system 3 form a gravitational member by their accommodation within the vertical cylinder 30B and provide automatic leveling for the optical unit 31. Accordingly, the optical unit 31, with the optical axis 20 as its center, rotates and corrects its position. As a result, the vertical cylinder 30B is positioned within the vertical plane 22 that includes the optical axis 20 and the image 12 is projected horizontally onto the screen 11. Because the light source 2 and the relay optical system 3 form a gravitational member and provide automatic leveling for the optical unit 31 it is unnecessary to provide a separate weight, as in the first embodiment.

Figure 7:
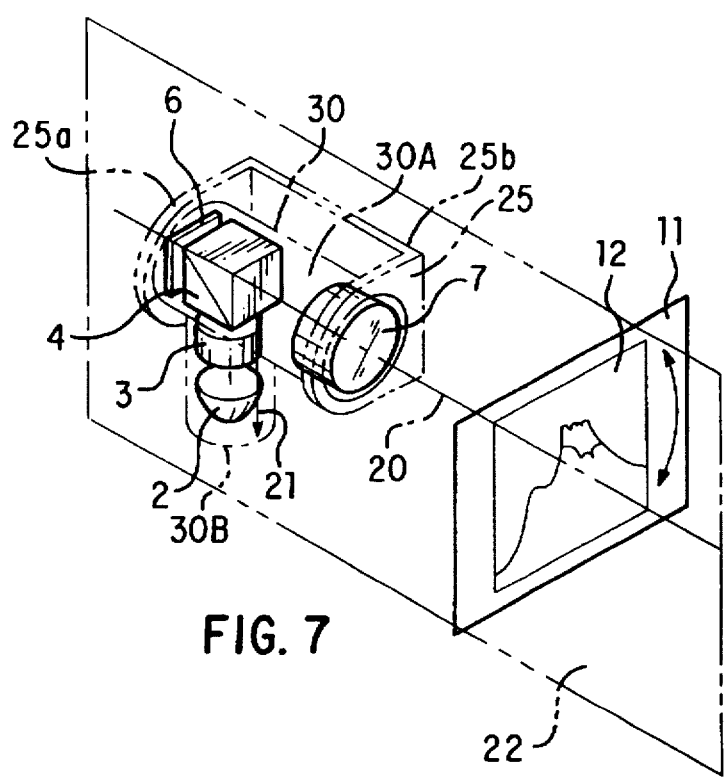
FIG. 7 is a perspective view showing a third embodiment of the present invention.

FIG. 7 is a perspective view showing a third embodiment of the present invention. In this embodiment, the housing 30 is formed as an upside down L-shape by the horizontal cylinder 30A and the vertical cylinder 30B. Within the horizontal cylinder 30A, the polarized beam splitter 4, the spatial light modulation element 6 and the projection optical system 7 are arranged on the same straight line so that they have mutually coincident centers. Within the vertical cylinder 30B, the light source 2 and the relay optical system 3 are housed. The rest of the structure is the same as described above in the second embodiment. In this structure as well, the light source 2 and the relay optical system 3 form a gravitational member and therein provide an automatic leveling function for the optical unit 31. Therefore it is unnecessary to provide a separate weight and is possible to correct the orientation in the horizontal direction of the image 12 that is projected onto the screen 11.

Figure 8:
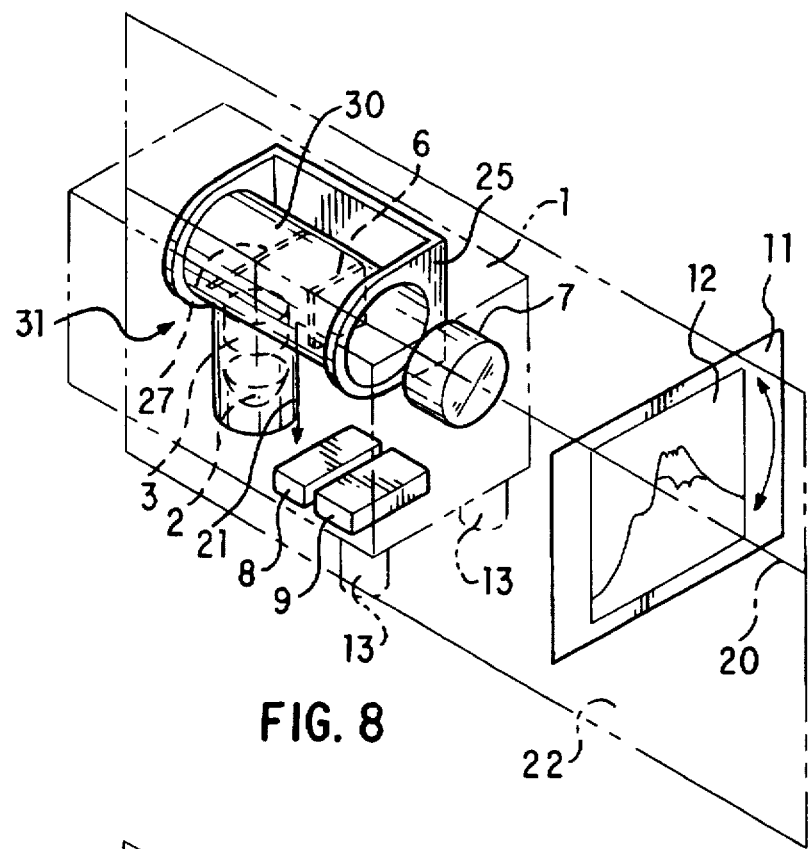
FIG. 8 is a perspective view showing a fourth embodiment of the present invention.

FIG. 8 is a perspective view illustrating the fourth embodiment of the present invention. In this embodiment, a power source 8 and an electric circuit 9 are also accommodated in the case 1. The optical unit 31 is the same as shown in FIG. 7. FIG. 8 illustrates the optical unit 31 coupled to a retaining member 25. Retaining member 25 is connected to a side wall of case 1. Retaining member 25 allows the optical unit 31 to rotate freely about the optical axis 20 of the projection optical system 7.

Figure 9:
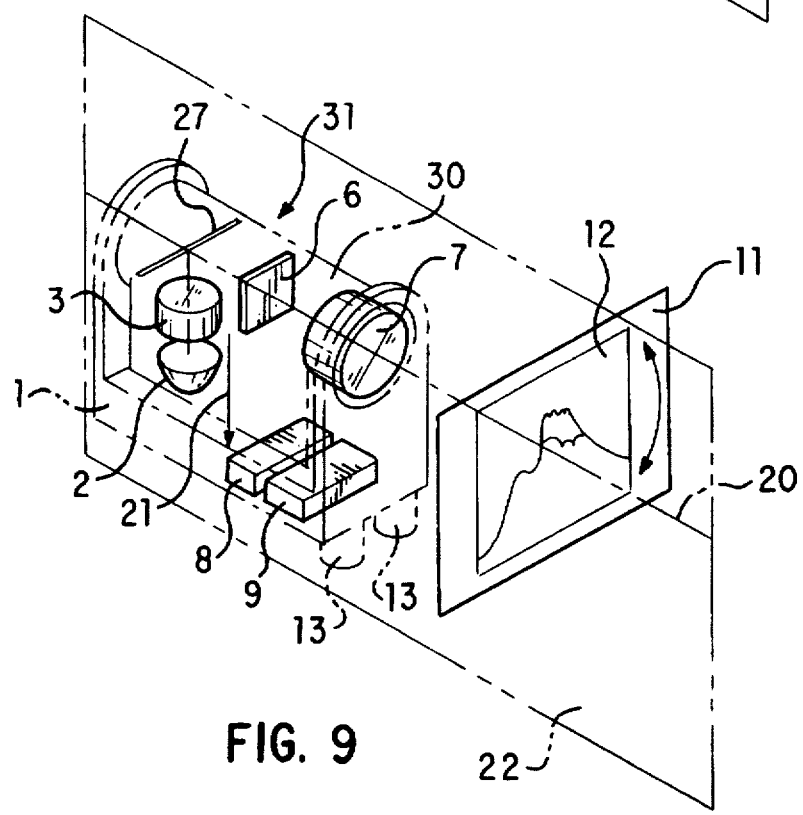
FIG. 9 is a perspective view showing a fifth embodiment of the present invention.

FIG. 9 is a perspective view showing a fifth embodiment of the present invention. In this embodiment, the optical unit 31 housing 30 includes axles provided at the front and rear ends of the optical unit 31. The axles reside in axle holes provided in the case 1 enabling the optical unit 31 to rotate freely about the optical axis 20 of the projection optical system 7. The optical unit 31 therein possesses an automatic leveling function utilizing the light source 2 and the relay optical system 3 as a gravitational member.

Figure 10:
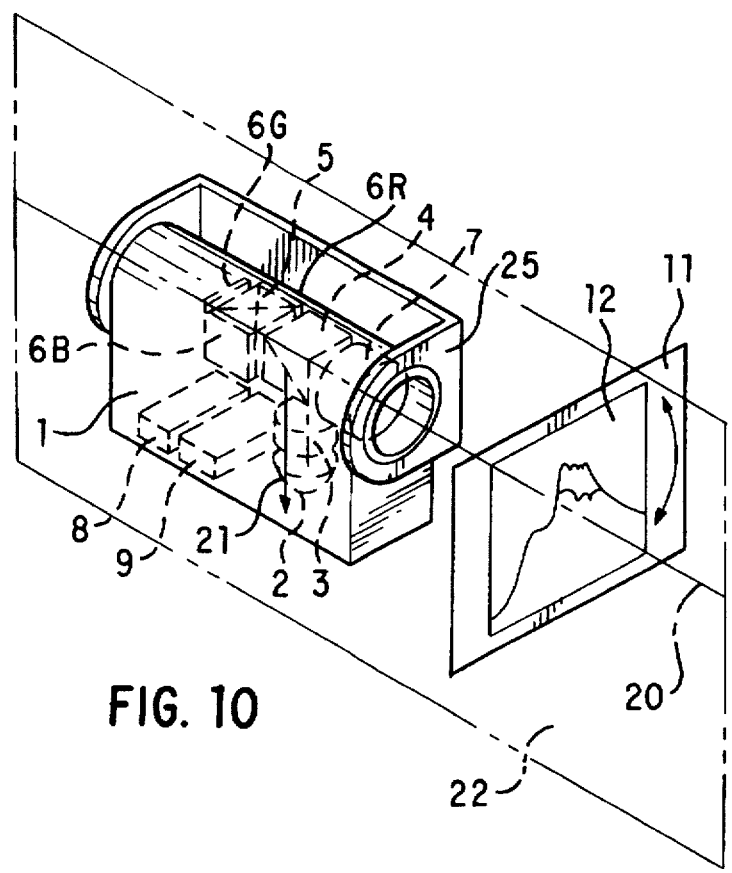
FIG. 10 is a perspective view showing a sixth embodiment of the present invention.

FIG. 10 is a perspective view showing a sixth embodiment of the present invention. In this embodiment, the case 1 is formed in a box shape similar to the housing 30 illustrated in FIG. 9. The axles provided at the front and rear of the case 1 are supported via axle holes of a support member 25. This allows the case 1 to rotate freely about the optical axis 20 of the projection optical system 7. The light source 2, relay optical system 3, power source 8 and electric circuit 9 form a gravitational member as a result of being arranged in an interior, lower section of the case 1, therein providing the case 1 with an automatic leveling function. This particular projector is configured as a suspended type of projector via the support member 25 which may be mounted to a surface, for example a wall.

Figure 11:
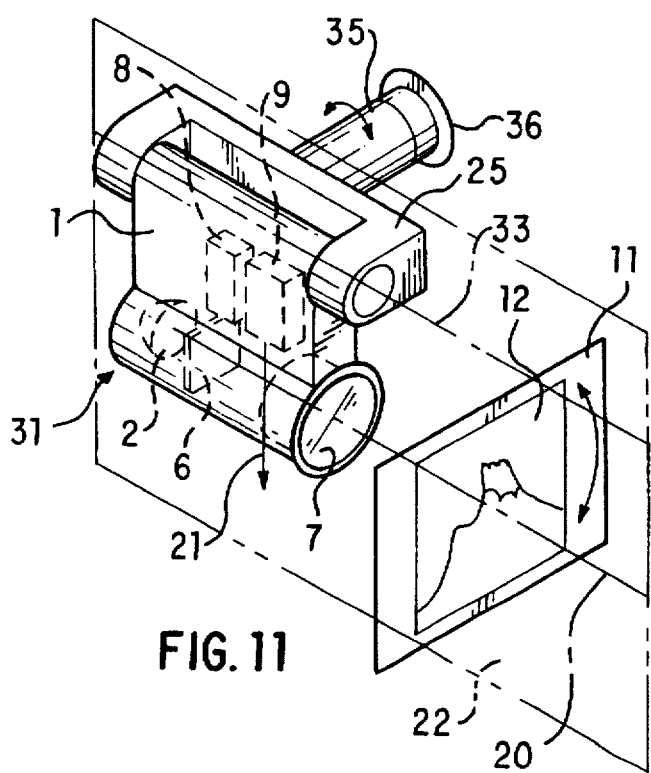
FIG. 11 is a perspective view showing a seventh embodiment of the present invention.

FIG. 11 is a perspective view showing a seventh embodiment of the present invention. This embodiment illustrates another example of a wall mounted suspension type projector. A case 1 accommodates a light source 2, a spatial light modulation element 6, a projection optical system 7, a power source 8, and an electric circuit 9. The case 1 is retained via a retaining member 25 so as to freely rotate about an axis 33 that is parallel to the optical axis 20 of the projection optical system 7. The light source 2, spatial light modulation element 6, and projection optical system 7 are configured as a gravitational member by being arranged in a straight line in a lower section of the interior of the case 1, therein providing the optical unit 31 with an automatic leveling function. The retaining member 25 has a horizontal support axle 35 provided on a rear surface side of the retaining member 25. The supporting axle 35 is supported by for example a suction cup 36 mounted on a wall surface. This allows the retaining member 25 to freely rotate. Therefore, when the supporting axle 35 is rotated in the direction of the axle, the optical axis 20 of the projection system 7 is sloped with regard to a horizontal plane and therefore provides for adjusting the angle of view.

In a suspension type projector as illustrated in FIG. 11, it is possible only to adjust the angle of view by rotating the supporting axle 35 and to correct the orientation in the horizontal direction of the image 12 via the automatic leveling function provided by the case 1. In this situation, when the orientation in the horizontal direction of case 1 is corrected via the automatic leveling function, the optical axis 20 is positioned within the vertical plane 22, which includes the rotation axis 33 of the case 1. Further, the position of the projector is not limited to be mounted to a wall surface.

Figure 12:
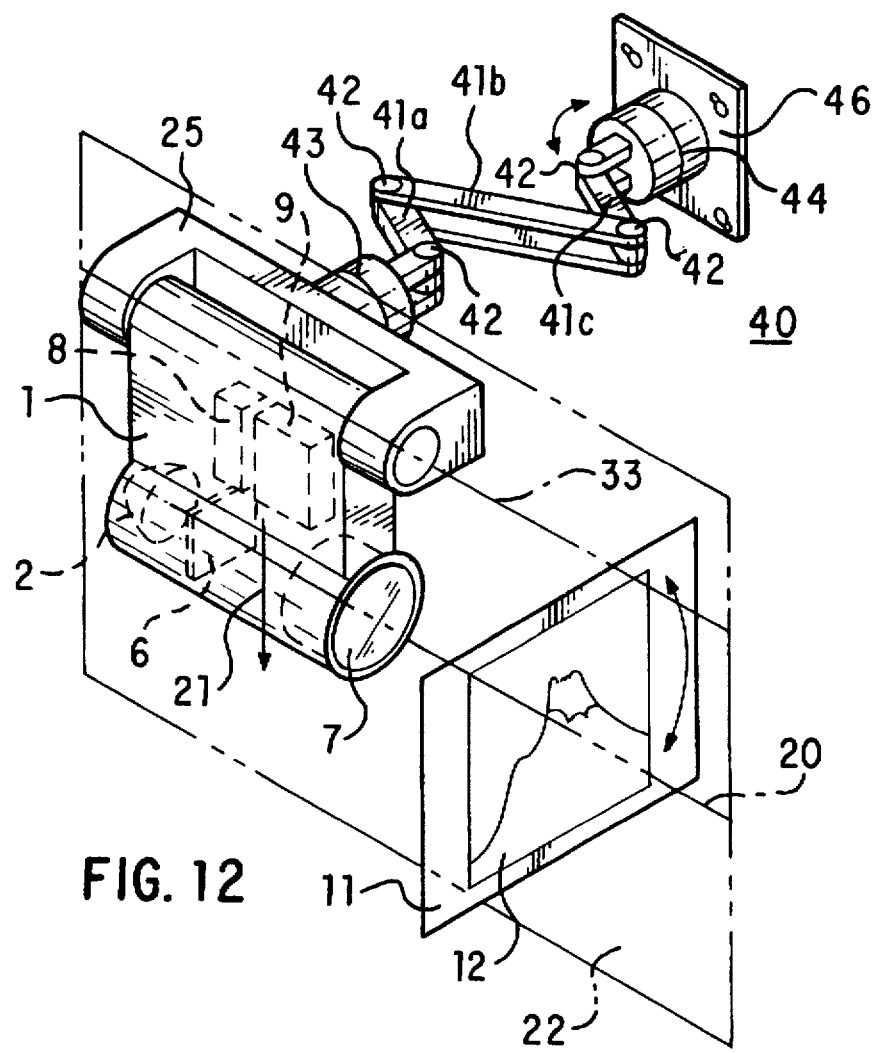
FIG. 12 is a perspective view showing an eighth embodiment of the present invention.

FIG. 12 is a perspective view showing an eighth embodiment of the present invention. In this embodiment, in place of the supporting axle illustrated in FIG. 11, the retaining member 25 is retained by a freely extendible/retractable support mechanism 40. The support mechanism 40 is equipped with three arms 41A, 41B and 41C, which are connected via pin(s)42 so that they are freely collapsible. The arm 41A on the projector side of the support mechanism 41 is connected to a joint coupling 43 provided on the rear surface of the retaining member 25 and the arm 41C on the wall surface side is connected to a joint coupling 44 mounted on the wall surface. The joint couplings 43 and 44 support arms 41A and 41C so as to allow free rotation in the direction of the arrow. As a result, the retaining member 25 adjusts the orientation angle of view. Further, the joint coupling 44 on the wall surface side is mounted to the wall surface via a mount member 46. A power supply plug (not shown) is provided at this mount member 46. In the case in which it is used as a portable projector, it is supplied with a separate battery and it can be used by being attached to this battery, similar to the use of a power supply plug. Further, in the event that it is used by being set on a desk or the like, it can be used by supplying an adapter having a power supply plug function. The remainder of the structure is identical to the embodiment shown in FIG. 11. In this structure, the angle of view may be adjusted via the support mechanism 40 and the slant in the horizontal direction of the image 12 can be corrected via the automatic leveling function provided by the case 1 itself. Further, during non-use, the projector can be maintained along the wall surface by collapsing the support mechanism 40.

Figure 13:
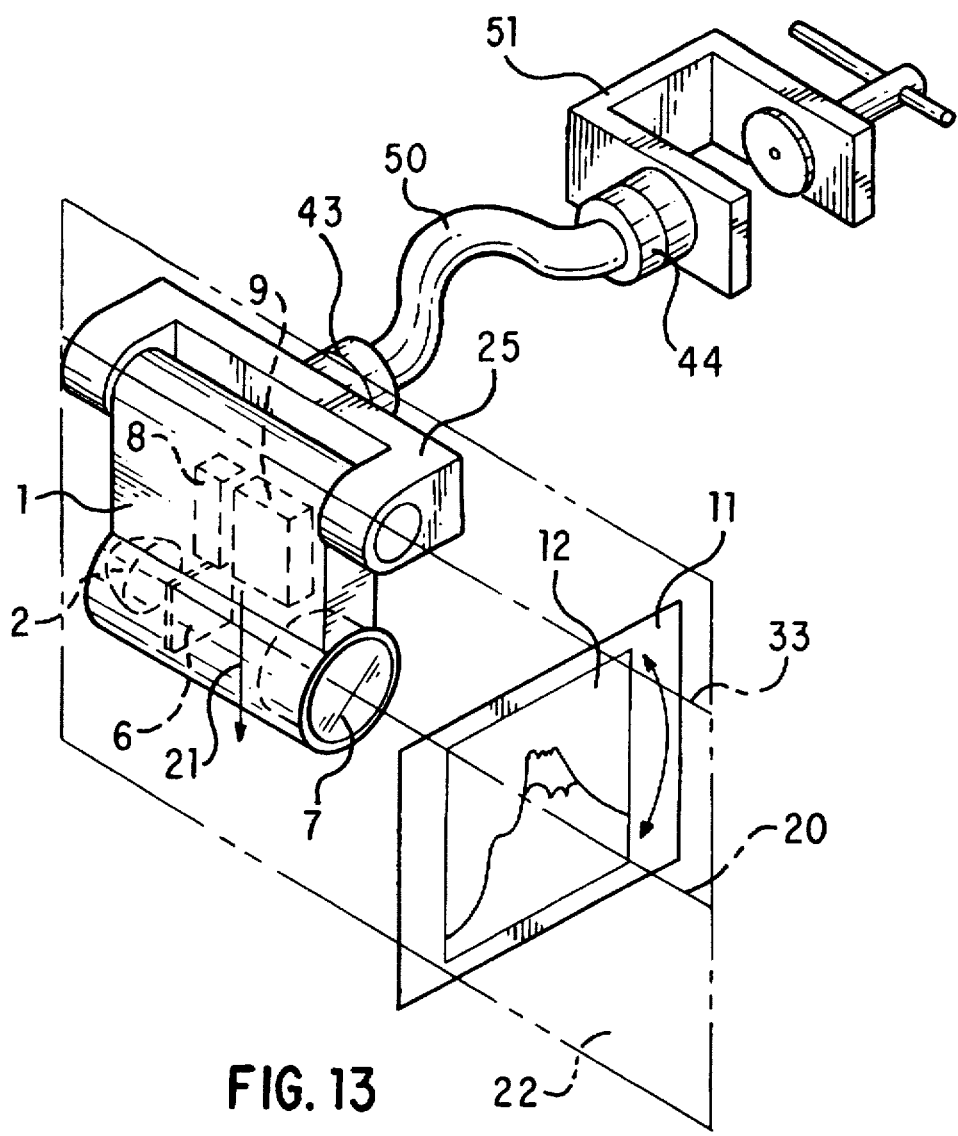
FIG. 13 is a perspective view showing a ninth embodiment of the present invention.

FIG. 13 is a perspective view showing a ninth embodiment of the present invention. In this embodiment, a flexible support arm 50 is employed as the support mechanism of the retaining member 25. One end of the support arm 50 is connected via the joint coupling 43 to the rear surface of the retaining member 25 and the other end is connected via the joint coupling 44 to a vice 51. The rest of the structure is identical to the embodiments shown in FIGS. 11 and 12. This embodiment may be set in various locations utilizing the vice 51, for example a desk, setting stand, pillar, or tree. Further, the support arm 50 is flexible and adjusts the angle of view via bending.

Figure 14:
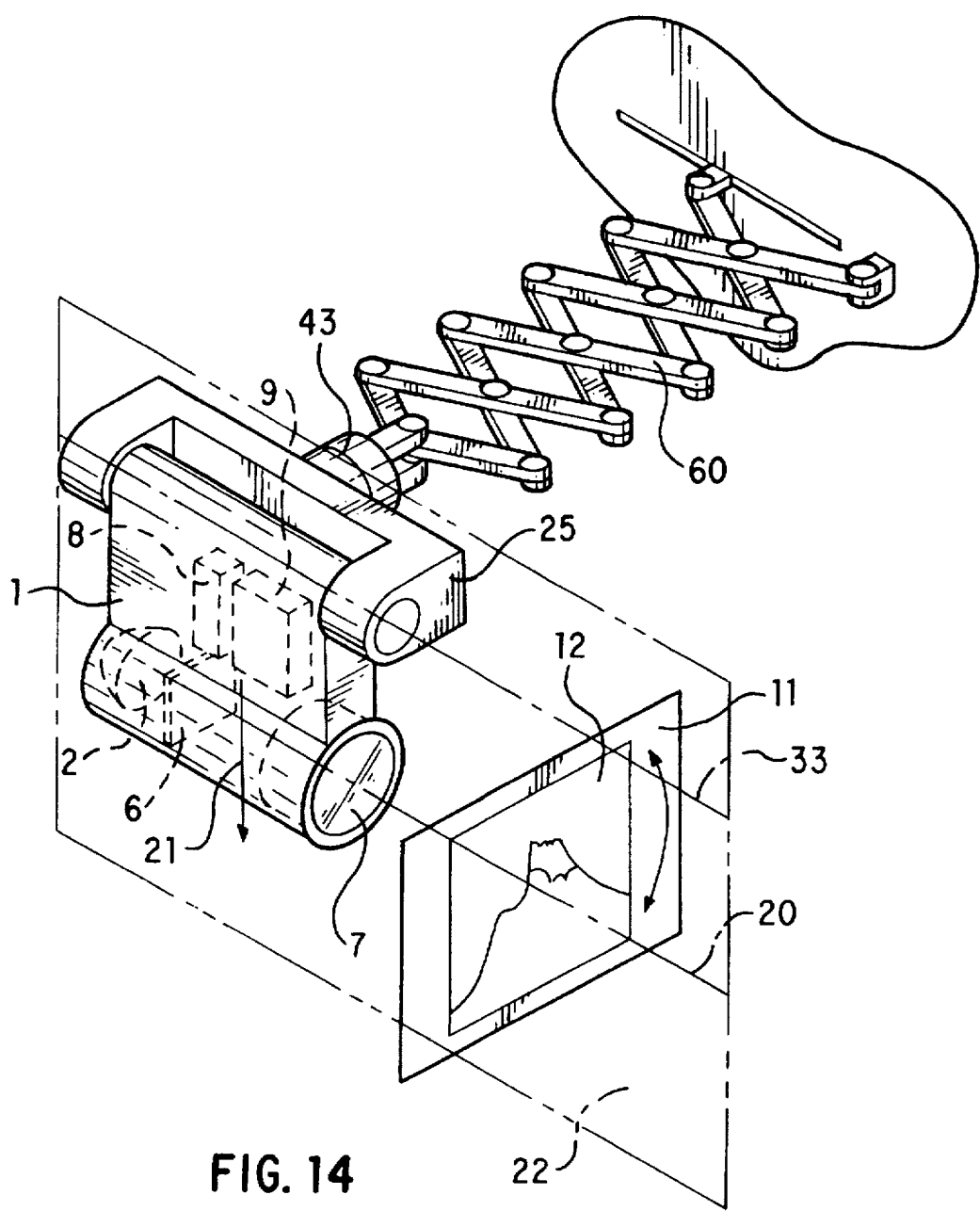
FIG. 14 is a perspective view showing a tenth embodiment of the present invention.

FIG. 14 is a perspective view showing a tenth embodiment of the present invention. In this embodiment, an extendible/retractable mechanism 60, a so-called basic flat pliers, is employed as a support mechanism of the retaining member 25. The joint coupling 43 retains the retaining member 25 so as to freely rotate within the perpendicular surface and is thus able to adjust the angle of view. The extendible/retractable mechanism 60 is not limited to being manually operated. It may also extend and retract automatically via for example a drive motor. The rest of the structure is identical to the embodiment shown in FIG. 13. In this structure, it is possible, by extending or retracting the mechanism 60 to separate the liquid crystal projector from a wall surface. This allows the degree of freedom in setting a location of the screen 11 to be increased.

The embodiments described above, while applicable to various liquid crystal projectors, may also be applied to general projectors that project film images. In this case, the mount onto which the film is loaded is retained via a retaining member so as to freely rotate about the optical axis of the projection optical system, wherein this mount may provide an automatic leveling function by a gravitational member such as a weight. Further, it is preferable to provide a certain degree of frictional resistance because it is difficult to see an image in which oscillation continues long after the projector is set.

Figure 15:
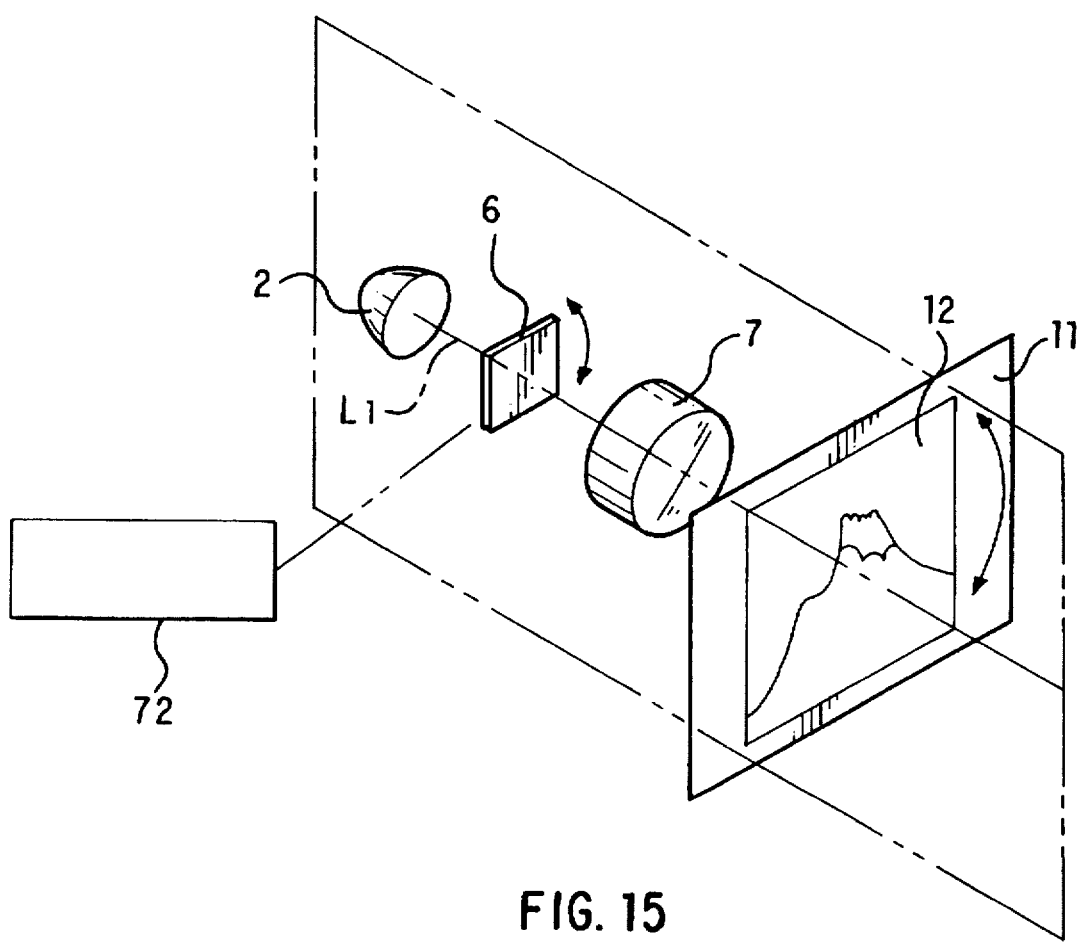
FIG. 15 is a perspective view showing an eleventh embodiment of the present invention.

FIG. 15 is a schematic block diagram showing an eleventh embodiment of the present invention. In this embodiment, the projector includes a light source 2 and a projection optical system 7 arranged coincident with an optical axis L1. The center of the spatial light modulation element 6 is also arranged as coincident with the optical axis L1. Further, the spatial light modulation element 6 is retained so as to freely rotate about the optical axis L1 and the slant in the horizontal direction is automatically corrected via an automatic leveling mechanism 72.

Figure 16:
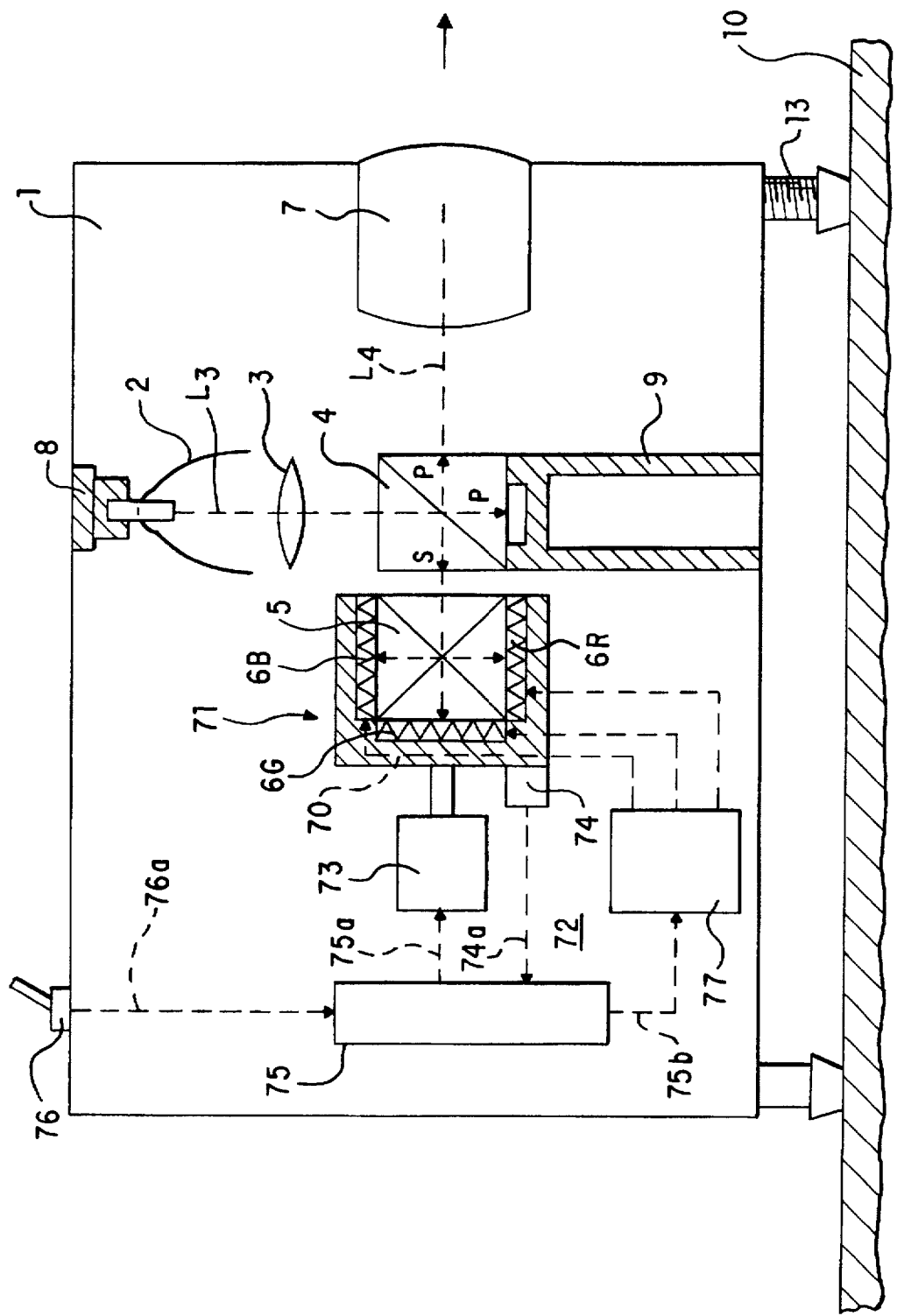
FIG. 16 is a block diagram showing a twelfth embodiment of the present invention.

FIG. 16 provides a schematic block diagram illustrating a twelfth embodiment in which a liquid crystal projector is applied to a projector of the present invention. In FIG. 16, the optical axis L3 of the light source 2 and the relay optical system 3, which are placed above the polarized beam splitter 4 is arranged as orthogonal to the optical axis L4 of the polarized beam splitter 4, the cross dichroic mirror 5 and the projection optical system 7. The cross dichroic mirror 5 and the spatial light modulation elements 6B, 6G and 6R are composed integrally as an optical block 71, by being accommodated within a housing 70. Further, this optical block 71 is retained so as to freely rotate about the optical axis L4 so that it automatically corrects the slant in the horizontal direction via an automatic leveling mechanism 72.

As shown in FIG. 3(b), even when the case 1, which includes the light source 2 and the spatial light modulation element 6, and the automatic leveling mechanism 22 is slanted, the optical block 71 is rotated about the optical axis L4 to the side opposite to the slanted direction of the case 1, only to an angle identical to the angle of the slant of the case, so as to automatically adjust to correct that slant, and so as to make the picture image 12, that is projected onto the screen 11, horizontal.

Figure 3A:
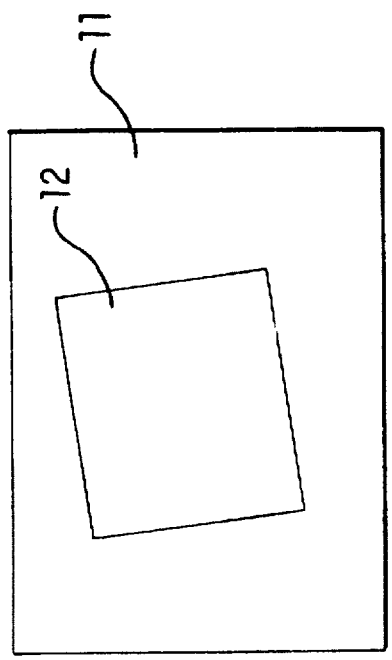

The automatic leveling mechanism 72 is a mechanism for allowing the picture image 12 to be projected horizontally onto the screen 11, as illustrated in FIG. 3(a). The automatic leveling mechanism 72 detects the slant (orientation) of the optical block 71. When the optical block 71 is slanted, the slant is adjusted by rotating the optical block 71 in the direction opposite to the slanted direction, only to an angle identical to this slant angle. This automatic leveling mechanism 72 is equipped with a step motor 73, which is used as an actuator to rotate the optical block 71 about the optical axis L4. The leveling mechanism 72 further includes a leveling instrument sensor 74 that successively detects how much the optical block 71 is slanted with respect to the gravitational direction and an image position controller 75 that controllably drives the step motor 73 in response to a signal 74a from the leveling instrument sensor 74. The leveling instrument sensor 74 is fixed to the case 70, and transmits an output signal 74a corresponding to the angle to which it is slanted with respect to the gravitational direction of the optical block 71, transmitting it to the image position controller 75. The image position controller 75 transmits a drive signal 75a, based on this output signal 74a, to the drive circuit of the step motor 73. As a result, the optical block 71, driven by the step motor 73 is rotated in a direction opposite from the slanted direction, only to an angle identical to the slant angle, to automatically correct the slant. Moreover, although automatic leveling mechanism 72, shown in FIG. 15, and automatic leveling mechanism 72 shown in FIG. 16, are composed in the same way, a point of difference exists in the rotation of the spatial light modulation element 6 itself.

In a liquid crystal projector of the type described above, even when the case 1, that accommodates the light source 2, the spatial light modulation element 6 in the projection optical system 7 is positioned as slanted to the left or the right, the spatial light modulation element 6, or the optical block 71 is rotated by the automatic leveling mechanism 72 to the side opposite to the slanted side of the case, to automatically correct the slant in the horizontal direction. As a result, the projected image 12 is projected horizontally onto the screen 11. Accordingly, a physical operation to adjust the slant of the image is unnecessary.

Also illustrated in FIG. 16 is a vertical/horizontal image surface changeover switch 76 provided on the case 1 and connected to an image position controller 75. When a signal 76a is input from the switch 76, the image position controller 75, simultaneously and controllably drives the step motor 73, controls the liquid crystal driver (drive circuit) 77 of the spatial light modulation element 6B, 6G and 6R. That is, the image position controller 75 selects which of the image surfaces, either vertically or horizontally is desired by the user via a signal 76a from the vertical/horizontal image surface changeover switch 76. For example, if a horizontal image surface is desired, as described above, the step motor 73 performs drive control based on a signal from the leveling instrument sensor 74, and the optical block 71 is rotated so that it is in a horizontal state. Further, to simplify the explanation of the operation of the liquid crystal driver 77 by using the example of TV signal scanning, a control signal 75b is transmitted to the liquid crystal driver 77, so that the liquid crystal driver 77 supplies a scanned signal to the spatial light modulation elements 6B, 6G and 6R commonly using line 1 of the horizontal image signal as the X direction scan signal, and line 2 and line 3 signals as the Y direction. The user can operate the vertical/horizontal image surface changeover switch 76 during presentations and the like, and when it is switched from the horizontal image surface position to the vertical image surface position, the step motor 73 controllably drives an optical block 71 based on a signal from the switch 76. At this time, the step motor 73 rotates the optical block 71 only 90° in a specified direction about the optical axis L4, so that a vertical status results.

Further, at this time, opposite from how it is commonly done, a control signal 75b is transmitted to the liquid crystal driver 77, so that the liquid crystal driver 77 supplies a scan signal to the spatial light modulation elements 6B, 6G and 6R, using the horizontal image position of line 1 as the scan signal of the Y direction, and lines 2 and 3 of the X direction. As a result, the projected image surface is changed over to a vertical image surface.

Although not specified in any of the illustrated embodiments described above, the present invention is also envisioned as providing the polarized beam splitter 4 integrally within the optical block 71, and a DC motor, ultrasonic motor, or the like, in place of the step motor 73 used as an actuator. Further, the spatial light modulation element or optical block may be retained to freely rotate about the optical axis of the projection optical system and a parallel optional axis. Further, the image position controller 75 may be implemented as a low cost microprocessor unit and motor driver. Still further, in the conversion from a horizontal image surface of the picture image to a vertical image surface, it is envisioned to display the image on a VRAM (Video Random Access Memory), by a method utilizing address conversion in accordance with a 90° vertical/horizontal rotation. Furthermore, the signal situation of the vertical/horizontal image surface changeover switch 76, and the output from the liquid crystal projector, can be communicated to a person or computer via, for example, an output means such as an RS-232C connection. At this time, on the personal computer side, it is possible to change over to analog R, G, B signal output, and easily display the analog R, G, B signal output of a conventional horizontal image surface vertically, making it possible to broaden the range of applications.

What is claimed is:

1. A projector comprising:
   a spatial light modulation element; and
   a projection optical system having an optical axis, wherein the spatial light modulation element automatically rotates about an axis parallel to the optical axis in response to an external parameter.

2. A projector as recited in claim 1, wherein the spatial light modulation element is retained by a retaining member so as to freely rotate about the optical axis of said projection optical system, and the orientation in the horizontal direction is achieved by providing the spatial light modulation element with a gravitational member therein providing automatic leveling.

3. A projector as recited in claim 2, wherein the gravitational member is a weight.

4. A projector as recited in claim 2, wherein the gravitational member is the light source.

5. A projector as recited in claim 1, further comprising a light source, wherein the light source, the spatial light modulation element and the projection optical system are maintained in a housing,
   wherein the optical axis of the projection optical system coincides with the center of the spatial light modulation element and the housing is retained by a retaining member so as to freely rotate about the optical axis, the housing further including a gravitational member which provides orientation in the horizontal direction of the housing.

6. A projector as recited in claim 5, wherein the gravitational member is a weight.

7. A projector as recited in claim 5, wherein the gravitational member is the light source.

8. A projector as recited in claim 1, further comprising a sensor for detecting orientation of the spatial light modulation element about the optical axis and means for rotating the spatial light modulation element to provide a horizontal projected image.

9. A projector comprising an optical unit wherein the optical unit is positionally arranged within a housing, wherein the optical unit comprises a light source, a spatial light modulation element and a projection optical system including an optical axis, wherein the optical axis coincides with the center of the spatial light modulation element and wherein the optical unit is retained by the housing so as to freely rotate about the optical axis, and wherein the orientation in the horizontal direction of the optical unit is adjusted by a gravitational member coupled to the optical unit.

10. A projector as recited in claim 9, wherein the gravitational member is a weight.

11. A projector as recited in claim 9, wherein the gravitational member is the light source.

12. A projector that accommodates a light source, a spatial light modulation element, and a projection optical system within a housing, wherein, the optical axis of said projection optical system coincides with the center of said spatial light modulation element, wherein said housing is retained via a retaining member so as to freely rotate about an axis parallel to the optical axis, and the orientation in the horizontal direction of the housing is corrected by providing the housing with an automatic leveling function via a gravitational member.

13. A projector as recited in claim 12, wherein the gravitational member is a weight.

14. A projector as recited in claim 12, wherein the gravitational member is the light source.

15. A projector comprising a light source, a mount into which film is loaded, and a projection optical system wherein, the mount is retained by a retaining member so as to freely rotate about an optical axis of the projection optical system, and the orientation in the horizontal direction of the mount is corrected by providing the mount with an automatic leveling function via a gravitational member.

16. A projector as recited in claim 15, wherein the gravitational member is a weight.

17. A projector as recited in claim 15, wherein the gravitational member is the light source.

18. A projector comprising a spatial light modulation element, an automatic leveling mechanism that retains the spatial light modulation element so that it freely rotates about an optical axis of a projection optical system, a sensor which detects slant in the horizontal direction of the spatial light modulation element and automatically corrects the slant.

19. A projector as recited in claim 18, further comprising a vertical forward/horizontal image surface changeover switch.

20. A projector as recited in claim 19, wherein the image position controller, while simultaneously controllably driving the actuator via a signal from the vertical/horizontal image surface changeover switch, controls a drive circuit of the spatial light modulation element.

21. A projector as recited in claim 20, further comprising means to output a status signal of the vertical/horizontal image surface changeover switch.

22. A projector as recited in claim 18, wherein the automatic leveling mechanism comprises an actuator that rotates the spatial light modulation element about the optical axis and an image position controller that controllably drives the actuator in response to a signal from the sensor.

23. A projector as recited in claim 22, further comprising a vertical forward/horizontal image surface changeover switch.

24. A projector as recited in claim 23, further comprising means to output a status signal of the vertical/horizontal image surface changeover switch.

25. A projector as recited in claim 18, wherein the automatic leveling mechanism comprises an actuator that rotates the optical block about the optical axis and an image position controller that controllable drives the actuator in response to a signal from the sensor.

26. A projector as recited in claim 25, further comprising a vertical forward/horizontal image surface changeover switch.

27. A projector as recited in claim 26, further comprising means to output a status signal of the vertical/horizontal image surface changeover switch.

28. A projector comprising a dichroic mirror that resolves and composes polarized light waves, divided via a polarized beam splitter into the respective light colors of red, green, and blue, and a spatial light modulation element that, via picture image signals, modulates the respective colors of light resolved via the dichroic mirror and an automatic leveling mechanism that integrates the spatial light modulation element and dichroic mirror to form an optical block wherein the optical block rotates freely about an optical axis of a projection optical system wherein slant in the horizontal direction of the optical block is automatically corrected in response to signals from a sensor.

29. A projector as recited in claim 28, further comprising a vertical forward/horizontal image surface changeover switch.

30. A projector as recited in claim 29, wherein the image position controller, while simultaneously controllably driving the actuator via a signal from the vertical/horizontal image surface changeover switch, controls a drive circuit of the spatial light modulation element.

31. A projector as recited in claim 30, further comprising means to output a status signal of the vertical/horizontal image surface changeover switch.

* * * * *